United States Patent Office 3,812,116
Patented May 21, 1974

---

3,812,116
7-ACYLATED 3-SUBSTITUTED CEPHALOSPORIN COMPOUNDS
Tadayoshi Takano, Hirakata, Kazuo Kariyone, Kyoto, Masaru Kurita, Takatsuki, Hisatoyo Yazawa and Hitoshi Nakamura, Toyonake, and Mitsunori Hasegawa, Ikeda, Japan, assignors to Fujisawa Pharmaceutical Co., Ltd., Osaka, Japan
No Drawing. Filed July 2, 1971, Ser. No. 159,485
Int. Cl. C07d 99/24
U.S. Cl. 260—243 C         12 Claims

ABSTRACT OF THE DISCLOSURE

Compounds of the formula

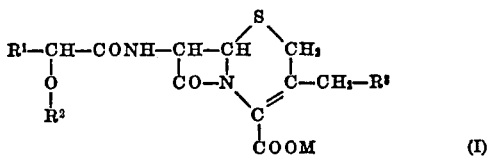

in which $R^1$ is hydrogen, lower alkyl, aryl, thienyl or furyl,
$R^2$ is acyl containing more than one carbon atom,
$R^3$ is hydrogen, azido or heterocyclic thio, and
M is hydrogen or a pharmaceutically acceptable, substantially non-toxic cation, have strong anti-bacterial activity and are active on oral administration.

---

The present invention is concerned with new and valuable cephalosporin derivatives and, more particularly, with 7-acylated 3-substituted cephalosporin compounds, as well as with pharmaceutical compositions containing such compounds and with the preparation of the new compounds.

It is well known that cephalosporins may be prepared by various processes. It is known that, by the treatment of heterocyclic acylated cephalosporin derivatives with heterocyclic thiols, the acetoxyl group in the 3-position of the cephalosporin nucleus can be removed (see U.S. Patent Specification No. 3,516,997). It is also known (see U.S. Patent Specification No. 3,124,576) that 3-desacetoxylated cephalosporins can be produced by the catalytic hydrogenation of the acetoxymethyl radical or cephalosporins in the presence of a palladium catalyst. The above-mentioned U.S. Patent Specification No. 3,516,997 also discloses that 3-heterocyclic thiolated 7-aminocephalosporanic acids can be acylated by conventional methods. British Patent Specification No. 1,073,530 discloses that cephalosporins can be prepared in considerably better yields than by acylation alone, from 7-aminocephalosporanic acid by silylation followed by an acylation. Various silylating agents which can be employed for silylation of 7-aminocephalosporanic acid are disclosed in Belgian Patent Specificaiton No. 737,761.

A number of cephalosporin derivatives have been prepared, for example, by various processes as briefly stated above and tested for therapeutic use in the therapy of bacterial infections. The therapeutically used cephalosporin antibiotics, especially when orally administered, are frequently not concentrated in an appreciable amount and are not absorbed in sufficient concentration to cause satisfactory inhibition of the growth of infectious bacteria. Even if such cephalosporin derivatives were absorbed in reasonably high concentrations, they frequently are not sufficiently active against a number of organisms.

We have now found a group of cephalosporin compounds which, when orally administered, are absorbed in concentrations sufficient to inhibit the growth of infectious organisms and thus are useful for the treatment of bacterial infections, such as those caused by Staphylococci and other infectious microorganisms, by oral administration.

Thus, according to the present invention, there are provided 7-acylated-3-substituted cephalosporin compounds of the general formula:

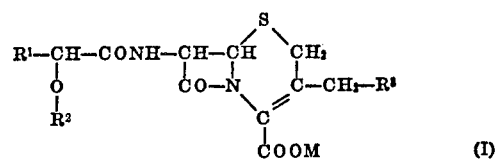

wherein $R^1$ is a hydrogen atom or a lower alkyl, aryl, thienyl or furyl radical, $R^2$ is an acyl radical containing more than one carbon atom, $R^3$ is a hydrogen atom, an azido group or a heterocyclic-thio radical and M is a hydrogen atom or a pharmaceutically acceptable, substantially non-toxic cation.

The "lower alkyl" radical $R^1$ is a straight-chain or branched aliphatic hydrocarbon radical containing up to four carbon atoms, which may be substituted, for example, by halogen atoms or lower alkoxy or aryloxy radicals. Examples of such lower alkyl radicals include, for example, methyl, ethyl, propyl, isopropyl, butyl, isobutyl and tert.-butyl radicals, optionally substituted by chlorine atoms or methoxy, ethoxy, propoxy, chloromethoxy, chloroethoxy, dichloroethoxy, phenoxy, chlorophenoxy or like radicals.

When $R^1$ is an aryl radical it can be an aromatic hydrocarbon radical optionally substituted by a halogen atom, a hydroxyl, nitro or amino group or a lower alkyl, lower alkoxy, lower alkylcarbonyloxy or lower akylthio radical. Examples of such aryl radicals include phenyl, naphthyl, chlorophenyl, hydroxyphenyl, nitrophenyl, aminophenyl, tolyl, methoxyphenyl, acetoxyphenyl and methylthiophenyl radicals.

The thienyl and furyl radicals $R^1$ may be unsubstituted or may be substituted by halogen atoms, amino or mercapto groups or lower alkyl or lower alkylthio radicals. Examples of such radicals include thienyl, furyl, chlorothienyl, chlorofuryl, methylthienyl and methylfuryl radicals.

The acyl radical $R^2$ containing more than one carbon atom can be represented by R—CO, wherein R is a lower alkyl, aryl, aryl-lower-alkyl or thienyl radical optionally interrupted by an oxygen atom. Examples of such acyl radicals include acetyl, chloroacetyl, dichloroacetyl, propionyl, butyryl, isobutyryl, methoxycarbonyl, ethoxycarbonyl, methoxyacetyl, trichloroethoxycarbonyl, benzoyl, chlorophenoxyacetyl, thienylcarbonyl, methylthienylcarbonyl and phenylacetyl radicals.

The term "heterocyclic-thio" includes an N-containing cyclic ring, such as a thiazolyl, thiadiazolyl, oxadiazolyl or tetrazolyl ring, which may be substituted by halogen atoms, amino or mercapto groups or lower alkyl or lower alkylthio radicals.

The compounds according to the present invention can be prepared, for example, from the starting material commonly known as Cephalosporin C, which is produced by culturing a cephalosporium strain in an appropriate nutrient medium in known manner. 7-acylated-aminocephalosporanic acids to be used in the present processes may be prepared by hydrolysing the Cephalosporin C antibiotic and then acylating the resulting 7-aminocephalosporanic acid in known manner. Other starting compounds include 3-substituted aminocephalosporanic acids, which may be prepared from 7-aminocephalosporanic acid by reaction with nucleophiles according to conventional methods. Alternatively, 3-substituted aminocephalosporanic acids may be produced by selectively hydrogenolysing 7-aminocephalosporanic acid in the presence of a catalyst, in known manner. Furthermore, α-hydroxy acid derivatives of the 3-substituted aminocephalosporanic acids to be used for the present invention may be synthesised from α-hydroxy acids and the 3-substituted aminocephalosporanic acids by conventional methods.

The preparation of the starting materials to be used according to the present invention is not limited to the processes briefly described hereinabove. These compounds can also be prepared by processes in which, if possible, the foregoing process steps are reversed. Other procedures may also be used for the production of the starting materials to be used according to the present invention.

When the cephalosporin derivatives are present in the reaction medium in the form of their free acids, the reaction may be carried out in the presence of a base, such as an alkali metal hydroxide, an alkali metal bicarbonate or an organic base, such as a trilkylamine, or in the presence of a buffer solution, such as a phosphate buffer. Salts of the acids may also be employed in the absence of a base or buffer.

In accordance with the present invention, the desired compounds may be prepared by acylating 3-substituted aminocephalosporanic acids of the general formula:

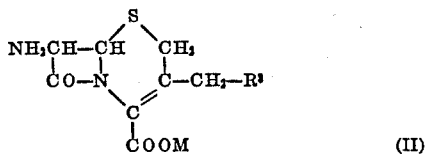

(II)

wherein $R^3$ and M have the same meanings as above, with disubstituted acetic acids of the general formula:

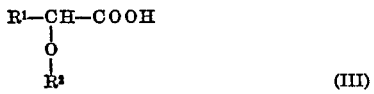

(III)

wherein $R^1$ and $R^2$ have the same meanings as above, or with reactive derivatives thereof.

The acylation reaction may be carried out in conventional manner, for example, in a solvent, such as dichloromethane, chloroform, tetrahydrofuran, acetone or water, or any other appropriate solvent. Preferred examples of the solvents to be used include aqueous acetone, tetrahydrofuran and water. The reaction is preferably carried out at ambient temperature, although the temperature used depends upon the reactants employed. When the disubstituted acetic acids of general formula (III) are used in the form of the free acids, acylation can be effected in the presence of a condensation agent, for example N,N'-dicyclohexylcarbodiimide, N,N'-diisopropylcarbodiimide, or the like. When using reactive derivatives of the acids, acylation may be carried out in the absence of a condensation agent. Examples of reactive derivatives include carboxylic acid halides, active amides, active esters, carboxylic acid anhydrides and mixed anhydrides with other carboxylic acids.

As is known, the majority of the disubstituted acetic acids of general formula (III) contain at least one asymmetric carbon atom and can exist in two optically active isomeric forms or in the DL-form. It is to be understood that the present invention includes both the D- and L-forms, as well as racemic mixtures.

Alternatively, the compounds of the present invention can be prepared by reacting 7-acylated aminocephalosporanic acids of the general formula:

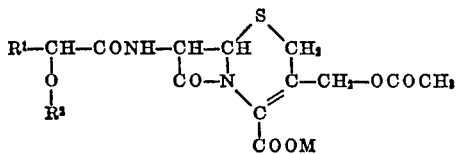

(IV)

wherein $R^1$, $R^2$ and M have the same meanings as above, with nucleophiles of the general formula:

$$R^{3'}—H \quad (V)$$

wherein $R^{3'}$ is azido or a heterocyclic-thio radical, or with a salt thereof.

The reaction may be carried out in a solvent, for example, water or water containing acetone or an alcohol. A buffer solution may be employed, preferably a phosphate buffer. The reaction may be carried out in the solvent at a temperature between ambient temperature and about 80° C., preferably from 55 to 65° C., at a pH of from 3.5 to 8.0, preferably of from 4.0 to 7.0, although the reaction conditions may vary depending upon the nature of the reactants employed. Furthermore, if necessary or desired, the reaction may be carried out under pressure, for example, of gaseous nitrogen. Metal salts of the azides and thiols which can be employed in the present process include alkali metal, alkaline earth metal, ammonium and amine salts.

The compounds according to the present invention can also be prepared by using 3-substituted derivatives of the Cephalosporin C antibiotic of the general formula:

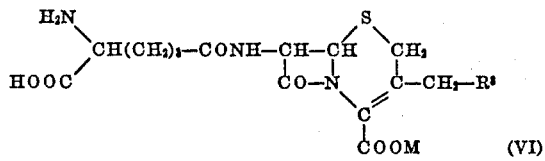

(VI)

wherein $R^3$ and M have the same meanings as above.

The reaction comprises silylation of the compounds of general formula (VI) with a silylating agent, halogenation of the silylated compounds, reaction of the resulting halogenated derivatives with alkanols or alkali metal alkoxides, acylation with disubstituted acetic acids of general formula (III) and hydrolysis of the acylated derivatives.

The silylation reaction may be effected in an anhydrous non-hydroxylic organic solvent, for example, dichloromethane, chloroform or the like, preferably at ambient temperature. Examples of silylating agents which can be used include halosilanes, such as dimethyldichlorosilane, diethyldichlorosilane, trimethylchlorosilane, trimethylbromosilane, diethylethylchlorosilane, dimethyl-n-propylchlorosilane and the like; silazanes, such as hexamethylsilazane and the like; monosilylamides, such as N-trimethylsilylacetamide, N-triethylsilyacetamide and the like; and the bis-silylamides, such as N,O-bis(trimethylsilyl)acetamide, N,O-bis(triethylsilyl)acetamide and the like. When using the halosilanes as the silylating agent, the reaction can be carried out in the presence of a base, such as triethylamine, N,N-dimethylaniline or of any other appropriate base, such as pyridine. The silylating agent is advantageously used in a molar ratio of at least 2 equivalents to the 3-substituted derivatives of general formula (VI)

The silylated compounds are then subjected to halogenation with a halogenation agent, for example phosphorus pentachloride or the like. The reaction can be carried out in the same solvent medium as employed for the silylation reaction, preferably with cooling.

The halogenated derivatives are then reacted with an alkanol or an alkali metal alkoxide. The reaction can be carried out advantageously in the same solvent medium, with cooling, as used in the halogenation above. Examples of such alkanols and alkali metal alkoxides include methanol, ethanol, propanol, isopropanol, butanol, sodium methoxide, sodium ethoxide, potassium methoxide and the like.

The resultant products are then acylated with disubstituted acetic acids of general formula (III) under substantially the same conditions as used for the acylation of the 3-substituted aminocephalosporanic acids of general formula (II). The acylation reaction is advantageously carried out in the same solvent medium as employed above.

The acylated derivatives are then subjected to hydrolysis with water or an aqueous solvent, to give the desired compounds according to the present invention. The reaction is preferably carried out at ambient temperature by adding water or an aqueous solvent to the reaction mixture containing the acylated derivatives.

The compounds of general formula (II) can also be reacted with α-hydroxy acids of the general formula:

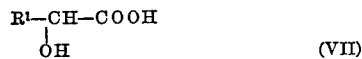

(VII)

wherein $R^1$ has the same meaning as above, or with a reactive derivative thereof to give α-hydroxy acid derivatives of the 3-substituted aminocephalosporanic acids of the general formula:

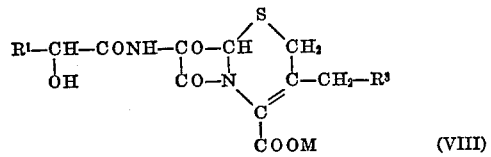

(VIII)

wherein $R^1$, $R^3$ and M have the same meanings as above, which may be then subjected to still another process. The desired compounds may be prepared by acylating compounds of the general formula (VIII) with carboxylic acids of the general formula:

(IX)

wherein $R^2$ has the same meaning as above, or with reactive derivatives thereof.

The acylation reaction can be carried out under substantially the same conditions as employed for the acylation of the compounds of general formula (II) with the disubstituted acetic acids of general formula (III).

The α-hydroxy acid part of these compounds can also contain an asymmetric carbon atom and can thus exist in two optically active forms. However, it is to be understood that the present invention also includes not only the D- and L-forms but also the racemic mixtures.

All the reactants used in the various processes of the present invention are either commercially available or can be prepared by conventional methods.

In accordance with the present invention, a precipitate which forms during the reaction is separated from the reaction mixture in conventional manner, whereafter the reaction product can be subjected to conventional purification procedures, for example, recrystallization from an appropriate solvent or a mixture of solvents.

The compounds of the present invention can be converted into pharmaceutically acceptable, substantially non-toxic salts, for example, by reaction with an alkali metal hydroxide, an alkali metal bicarbonate, an alkali metal carboxylate or an organic base, the sodium salts being preferred. The preferred method of preparing the salts is to dissolve the free acid in a solvent in which the salt is insoluble and then to add thereto a solution of the salt-forming compound or base. The salt thereby precipitates from the reaction mixture.

The compounds of the present invention have a high antibacterial activity and inhibit the growth of a number of microorganisms, including gram-positive and gram-negative bacteria. The compounds of the present invention also have the advantage of being excreted in bile and urea at such a high concentration, even when orally administered, that the growth of infectious microorganisms is inhibited.

For therapeutic administration, the cephalosporin compounds according to the present invention are used in the form of pharmaceutical preparations which contain said compounds in admixture with a pharmaceutically acceptable organic or inorganic solid or liquid excipient suitable for oral or parenteral administration. The pharmaceutical preparations may be in solid form, for example, as capsules, tablets or dragees, or in liquid form, for example, as solutions, suspensions or emulsions. If desired, they may contain auxiliary substances, stabilizing agents, wetting or emulsifying agents, buffers and other commonly used additives.

While the dosage of the compounds will vary from and also depend upon the age and condition of the patient, an average single dose of about 100 mg., 250 mg., and 500 mg. of the compounds according to the present invention has proved to be effective in treating diseases caused by bacterial infection. In general, amounts between 10 mg. and 1000 mg. or even more may be administered.

The following examples are given for the purpose of illustrating the present invention:

EXAMPLE 1

7 - (DL - 2 - acetoxy - 2 - phenylacetamido)-3-(5-methyl-1,3,4 - thiadiazol - 2 - ylthiomethyl) - 3 - cephem-4-carboxylic acid To a solution of 10.3 g. 7-amino-3-(5-methyl-1,3,4-thiadiazol - 2 - ylthiomethyl) - 3 - cephem - 4 - carboxylic acid and 10.0 g. sodium bicarbonate in 150 ml. water and 100 ml. acetone was added a solution of 7.0 g. DL-mandelic chloride in 50 ml. acetone, while cooling the solution at 0°–5° C. The solution was stirred for 1 hour at 5° C. and for another 2 hours at ambient temperature and then concentrated and washed with 200 ml. ether. The aqueous layer was separated, acidified to pH 2 with hydrochloric acid and extracted with 400 ml. ethyl acetate. The extract was washed with a sodium chloride solution, dried and evaporated to give a residue which was triturated with ether to give 8.4 g. of the crude desired compound; M.P. 115°–125° C. (decomposed).

EXAMPLE 2

7 - (D - 2 - acetoxy - 2 - phenylacetamido) - 3 - (5-methyl - 1,3,4 - thiadiazol - 2 - ylthiomethyl) - 3-cephem-4-carboxylic acid To a solution of 3.7 g. D-mandelic acid in 70 ml. tetrahydrofuran was added 4.0 g. N,N'-dicyclohexylcarbodiimide and the solution was stirred for 30 minutes at ambient temperature. After adding a solution of 6.88 g. 7 - amino - 3 - (5-methyl-1,3,4-thiadiazol-2-ylthiomethyl)-3-cephem-4-carboxylic acid and 1.68 g. sodium bicarbonate in 70 ml. water, the solution was stirred overnight at ambient temperature and concentrated, followed by the addition of 2 ml. sodium bicarbonate solution. The solution was washed with 100 ml. ethyl acetate and the aqueous layer was separated, acidified to pH 2 with hydrochloric acid and extracted with 500 ml. ethyl acetate. The extract was washed with 20 ml. sodium chloride solution, dried and evaporated to dryness. The residue was triturated with ether to give 1.5 g. of the crude desired compound; M.P. 91°–98° C. (decomposed).

EXAMPLE 3

7-(D-2-acetoxy-2-phenylacetamido)-3-methyl-3-cephem-4-carboxylic acid

A solution of 2.8 g. D-mandelic chloride in 25 ml. dried acetone was added to a solution of 3.4 g. 7-amino-3-methyl-3-cephem-4-carboxylic acid and 3.0 g. sodium bicarbonate in 75 ml. water and 50 ml. acetone. After stirring the solution for 1 hour at 5° C. and for another 3 hours at ambient temperature, the reaction mixture was concentrated and washed with 200 ml. ethyl acetate. The aqueous layer was separated, acidified to pH 1 with hydrochloric acid and extracted with 800 ml. ethyl acetate. The extract was washed with water and then with a sodium chloride solution and concentrated. The residue was dissolved in 300 ml. ether and left to stand overnight. There were obtained 2.0 g. of the desired crystalline compound; M.P. 185°–187° C. (decomposed).

EXAMPLE 4

7-[DL - 2 - acetoxy - 2 - (-thienyl) - acetamido]-3-(5-methyl-1,3,4-oxadiazol - 2 - ylthiomethyl)-3-cephem-4-carboxylic acid A solution of 1.0 g. 7-[DL-2-acetoxy-2-(2-thienyl)-acetamido]-cephalosporanic acid, 0.22 g. sodium bicarbonate and 0.32 g. 5-methyl-1,3,4-oxadiazole-2-thiol in 20 ml. phosphate buffer (pH 6.4) was stirred for 3 hours at 70° C. The reaction mixture was washed with 200 ml. ethyl acetate and the aqueous layer was separated, acidified to pH 1 with hydrochloric acid and then extracted with 400 ml. ethyl acetate. The extract was washed with water and then with sodium chloride solution, dried and concentrated. The residue was triturated with ether and left to stand overnight. There was obtained 0.4 g. of the desired compound in the form of a pale brown powder; M.P. 125°–130° C. (decomposed).

EXAMPLE 5

7-(D-2-acetoxy - 2 - phenylacetamido)-3-(5-methyl-1,3,4-thiadiazol-2-ylthiomethyl)-3-cephem-4-carboxylic acid A solution of 2.5 g. sodium 7-(5-aminoadipinamido)-3-5(-methyl - 1,3,4 - thiadiazol - 2 - yl - thiomethyl)-3-cephem-4-carboxylate in 30 ml. dichloromethane and 0.4 ml. trimethylchlorosilane or N-trimethylsilylacetamide were heated under reflux for 1 hour and cooled to about −50° C. to −40° C. To the cooled solution were added 2.2 g. phosphorus pentachloride and the mixture was stirred for 2 hours, followed by the addition of 0.3 ml. dimethylaniline and 15 ml. absolute methanol. After stirring for 30 minutes, the solution was gradually warmed to ambient temperature, stirred for 30 minutes and concentrated. The residue was poured into 30 ml. dichloromethane and to the suspension were added 5 ml. triethylamine and 2.9 g. D-mandelic chloride. The mixture was then stirred for 1 hour at 0°–50 °C. and for another 15 hours at ambient temperature. The reaction mixture was then concentrated and dissolved in water and the solution then acidified to pH 1 with hydrochloric acid and extracted with ethyl acetate. The extract was washed with a sodium bicarbonate solution and evaporated to give a white powder. The aqueous layer was separated and ethyl acetate added thereto, whereafter it was acidified, washed with water and evaporated to give a powder. The combined powders were triturated with ether and dried to give 0.59 g. of the desired compound.

UV: (in phosphate buffer, pH 6.4)

$\lambda_{max}.$ 265 m, $E_{1cm.}^{1\%}$ 200

EXAMPLE 6

7-(D-2-acetoxy - 2 - phenylacetamido)-3-(5-methyl-1,3,4-thiadiazol-2-ylthiomethyl)-3-cephem-4-carboxylic acid A solution of 0.1 g. 7-(D-2-hydroxy - 2 - phenylacetamido)-3-(5-methyl-1,3,4 - thiadiazol - 2 - ylthiomethyl)-3-cephem-4-carboxylic acid in 20 ml. acetic chloride was stirred for 3 hours at 60° C. and concentrated to give an oily substance which was dissolved in 15 ml. sodium bicarbonate solution and washed with 100 ml. ether. The aqueous layer was separated, acidified to pH 2 with hydrochloric acid and extracted with 150 ml. ethyl acetate. The extract was washed with a saline solution and evaporated to give about 50 mg. of the desired compound in the form of a powder; M.P. 91°–98° C. (decomposed).

EXAMPLE 7

Sodium 7(DL-2-acetoxy - 2 - phenylacetamido) - 3 - (5-methyl - 1,3,4 - thiadiazol - 2 - ylthiomethyl)-3-cephem-4-carboxylate 2 g. of the crude material obtained in Example 1 was dissolved in 15 ml. acetone, followed by the addition of a solution of 750 mg. sodium α-ethyl-hexanoate 3 ml. acetone. The solution was evaporated to dryness and the residue was triturated with ether to give 1.9 g. of the desired sodium salt; M.P. 165°–168° C. (decomposed).

When using, in place of the cephalosporanic acids or of Cephalosporin C or the sodium salts thereof, as well as the disubstituted acetic acids or the α-substituted hydroxy acids or their acid halides or the nucleophiles or sodium salts thereof employed as reactants in Examples 1 to 7, equimolecular amounts of the corresponding reactants and otherwise proceeding as described in said Examples 1 to 7, the following 7-acylated 3-substituted cephalosporanic acids are obtained:

| Example No. | D- and/or L-forms | R¹ | R² | R³ | M |
|---|---|---|---|---|---|
| 8 | | H | CO—CH₃ | 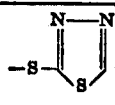 | H |
| 9 | | H | Same as above | 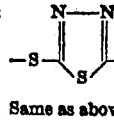 | H |
| 10 | DL | CH₃ | ....do.... | Same as above | H |
| 11 | D | 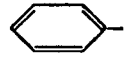 | ....do.... | H | Na |
| 12 | D | Same as above | ....do.... | —N₃ | Na |
| 13 | DL | ....do.... | ....do.... | 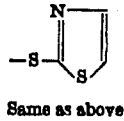 | H |
| 14 | DL | ....do.... | ....do.... | Same as above | Na |
| 15 | DL | ....do.... | ....do.... | 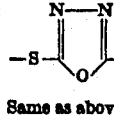 | H |
| 16 | DL | ....do.... | ....do.... | Same as above | K |
| 17 | DL | ....do.... | ....do.... |  | H |

TABLE—Continued

| Example No. | D- and/or L-forms | R¹ | R² | R³ | M |
|---|---|---|---|---|---|
| 18 | DL | phenyl | CO—CH₃ | 1,3,4-thiadiazol-2-ylthio | Na |
| 19 | D | ....do.... | ....do.... | ....do.... | Na |
| 20 | DL | ....do.... | ....do.... | 5-ethyl-1,3,4-thiadiazol-2-ylthio | H |
| 21 | DL | ....do.... | ....do.... | Same as above | Na |
| 22 | DL | ....do.... | ....do.... | 5-methylthio-1,3,4-thiadiazol-2-ylthio | H |
| 23 | DL | ....do.... | ....do.... | Same as above | Na |
| 24 | DL | ....do.... | ....do.... | 4-methyl-1,2,4-triazol-3-ylthio | H |
| 25 | DL | ....do.... | ....do.... | Same as above | Na |
| 26 | D | ....do.... | ....do.... | ....do.... | H |
| 27 | D | ....do.... | ....do.... | ....do.... | Na |
| 28 | D | ....do.... | CO—C₂H₅ | 1,3,4-thiadiazol-2-ylthio | H |
| 29 | D | ....do.... | Same as above | Same as above | Na |
| 30 | DL | ....do.... | ....do.... | 5-methyl-1,3,4-thiadiazol-2-ylthio | H |
| 31 | L | ....do.... | CO—CH₃ | Same as above | Na |
| 32 | D | ....do.... | CO—C₂H₅ | ....do.... | Na |
| 33 | D | ....do.... | CO—C₃H₇ | ....do.... | Na |
| 34 | DL | ....do.... | CO—CH(CH₃)₂ | ....do.... | H |
| 35 | DL | ....do.... | Same as above | ....do.... | Na |
| 36 | D | ....do.... | ....do.... | ....do.... | Na |
| 37 | D | ....do.... | CO—CH₂Cl | ....do.... | H |
| 38 | D | ....do.... | CO—CHCl₂ | ....do.... | H |
| 39 | D | ....do.... | CO—CH₂—O—(4-chlorophenyl) | ....do.... | Na |
| 40 | DL | ....do.... | CO—OCH₂—CCl₃ | ....do.... | H |
| 41 | D | ....do.... | CO—phenyl | ....do.... | Na |
| 42 | DL | ....do.... | CO—CH₂—phenyl | ....do.... | H |
| 43 | DL | ....do.... | CO—(2-thienyl) | ....do.... | Na |
| 44 | DL | 4-NO₂-phenyl | CO—CH₃ | ....do.... | H |
| 45 | DL | Same as above | Same as above | 4-methyl-1,2,4-triazol-3-ylthio | H |
| 46 | DL | 4-CH₃O-phenyl | ....do.... | Same as above | Na |
| 47 | DL | Same as above | ....do.... | 5-methyl-1,3,4-thiadiazol-2-ylthio | Na |
| 48 | DL | 4-CH₃COO-phenyl | ....do.... | ....do.... | Na |
| 49 | DL | Same as above | ....do.... | 4-methyl-1,2,4-triazol-3-ylthio | Na |

TABLE—Continued

| Example No. | D-and/or L-forms | R¹ | R² | R³ | M |
|---|---|---|---|---|---|
| 50 | DL | (thiophene) | CO—CH₃ | (1-methyl-tetrazol-5-yl-thio) | H |
| 51 | DL | Same as above | do | do | Na |
| 52 | DL | do | do | H | H |
| 53 | DL | do | do | —N₃ | H |
| 54 | DL | do | do | (thiazol-2-yl-thio) | H |
| 55 | DL | do | do | Same as above | Na |
| 56 | DL | do | do | (1,3,4-thiadiazol-2-yl-thio) | H |
| 57 | DL | (thiophene) | do | (5-methylthio-1,3,4-thiadiazol-2-yl-thio) | H |
| 58 | DL | Same as above | do | Same as above | Na |
| 59 | DL | do | do | (5-methyl-1,3,4-thiadiazol-2-yl-thio) | H |
| 60 | DL | do | do | Same as above | Na |
| 61 | DL | do | CO—C₂H₅ | do | H |
| 62 | DL | do | CO—C₆H₅ | do | Na |
| 63 | D | (phenyl) | CO—C(CH₃)₃ | do | Na |
| 64 | DL | Same as above | CO—CH₂—(2-chlorophenyl) | do | H |
| 65 | DL | do | do | do | Na |
| 66 | DL | (furan) | CO—CH₃ | do | Na |

The compounds as shown above have the following physical properties:

| Example No. | Melting point (°C.) | UV, λmax (mμ) | $E^{1\%}_{1cm}$ |
|---|---|---|---|
| 8 | 86–88 | 272 | 251 |
| 9 | 160–160.5 | 273 | 296 |
| 10 | 91–100 | 273 | 264 |
| 11 | 230–232 | 267 | 184 |
| 12 | 175–180 | 264 | 185 |
| 13 | 120–125 | 265 | 176 |
| 14 | 126–130 | 264 | 156 |
| 15 | | 267 | 215 |
| 16 | 137–139 | 267 | 204 |
| 17 | | *271 | 225 |
| 18 | 130–132 | 271 | 210 |
| 19 | 143–145 | | |
| 20 | | 273 | 248 |
| 21 | 153–155 | 273 | 238 |
| 22 | 115–120 | 270 | 173 |
| 23 | 118–123 | *270 | 157 |
| 24 | 80–88 | 267 | 162 |
| 25 | 115–122 | †267 | 156 |
| 26 | 89–90 | 270 | 194 |
| 27 | 140–141 | 270 | 187 |
| 28 | 162–163 | 272 | 238 |
| 29 | 187–190 | | |
| 30 | 155–160 | 272 | 228 |
| 31 | 187–188 | 272 | 228 |
| 32 | 202–204 | *272 | 232 |
| 33 | 182–185 | *217–272 | 217 |
| 34 | 155–160 | 272 | 220 |
| 35 | 173–178 | 272 | 210 |
| 36 | 219–220 | *272 | 234 |
| 37 | 98–100 | 272 | 230 |
| 38 | 105–110 | 272 | 191 |
| 39 | 189–193 | *223 / *273 | 306 / 213 |
| 40 | 135–140 | 271 | 216 |
| 41 | 147–151 | *232–233 / *271 | 358 / 204 |
| 42 | 120–127 | 268 | 245 |
| 43 | 165–170 | *274 | 367 |
| 44 | | 272 | 390 |
| 45 | | 272 | 366 |
| 46 | 152–158 | 271 | 202 |
| 47 | 170–175 | 271 | 175 |
| 48 | 160–165 | | |
| 49 | 150–154 | | |
| 50 | 100–103 | 240 / †270 | 314 / 193 |
| 51 | 149–151 | 240 / †270 | 286 / 187 |
| 52 | 91–94 | 240 / 265 | 280 / 194 |
| 53 | | 243 / 271 | 288 / 224 |
| 54 | 125–128 | | |
| 55 | 160–170 | 243 / †270 | 252 / 207 |
| 56 | 81–83 | 237 / †273 | 310 / 211 |
| 57 | 121–126 | | |
| 58 | 230 | 238 / †273 | 242 / 204 |
| 59 | 110–113 | 240 / †270 | 307 / 234 |
| 60 | 152–154 | 240 / 270 | 270 / 227 |
| 61 | 110–117 | 238 / 272 | 287 / 213 |
| 62 | 184–186 | *235 / *272 | 404 / 246 |
| 63 | 70–75 | *270 | 189 |
| 64 | 119–124 | 270 | 176 |
| 65 | 145–155 | *270 | 216 |
| 66 | 120–125 | *270 | 180 |

†Inf.

The ultraviolet spectra were measured in a phosphate buffer (pH 6.4) unless indicated by an asterisk, in which case they were measured in water.

The new compounds of the present invention exhibit an activity against a number of microorganisms. The activity of the compounds is expressed as the minimum inhibitory concentration (MIC), which is determined by the usual serial agar dilution method. The tests were performed using a glucose-bouillon medium. The medium was incubated for 24–72 hours at 30° C., and the MIC's are expressed as the concentration of the compounds in mcg./ml. which inhibited the growth of the organisms.

The following test results were obtained:

| Test compounds | Staphylococcus aureus 209-P | Bacillus subtilis ATCC 6633 |
|---|---|---|
| Example: | | |
| 1 | 0.78 | 0.39 |
| 2 | 0.78 | 0.39 |
| 51 | 0.78 | 0.20 |
| 60 | 0.39 | 0.39 |

As stated above, some of the compounds of the present invention show outstanding advantages for use as an oral antibiotic. The sodium salts of the compounds of Examples 2 and 19 and a certain commercially available cephalosporins were tested. 3 mg. of such compounds in 0.5 ml. of distilled water were administered orally to randomized groups of 8 mice which were infected with some Staphylococcus isolated from patients prior to administration. As control, 8 mice previously treated were given distilled water only. According to observation 10 days after administration, 100% mortality of the control group was observed, while the mortality of the groups to which the sodium salts of Examples 19 and 2 had been given was 12.5% and 25%, respectively. A 37.5% death rate was observed with the commercial compound.

We claim:
1. Compounds of the formula

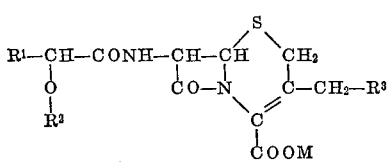

wherein
$R^1$ is hydrogen, lower alkyl, thienyl, furyl, phenyl, nitrophenyl, lower alkoxylphenyl or lower alkanoylphenyl;
$R^2$ is lower alkanoyl, halo-lower alkanoyl, benzoyl, phenyl-lower alkanoyl, halo-lower alkoxy carbonyl, thenoyl, halophenoxy-lower alkanoyl, or chlorophenylacetyl;
$R^3$ is thiazolylthio, thiadiazolythio, lower alkyl-thiadiazolythio, lower alkylthio-thiadiazolylthio, lower alkyl-oxa-diazolythio, or lower alkyl-tetrazolylthio; and
M is hydrogen or an alkali metal cation.

2. A compound according to claim 1 wherein
$R^1$ is phenyl,
$R^2$ is m-chlorophenylacetyl,
$R^3$ is 5-methyl-1,3,4-thiadiazol-2-ylthio, and
M is hydrogen;
said compound being in the D-configuration.

3. Compounds according to claim 1 in which
$R^1$ is hydrogen,
$R^2$ is acetyl,
$R^3$ is 1,3,4-thiadiozol-2-ylthio or 5-methyl-1,3,4-thiadiazol-2-ylthio, and
M is hydrogen.

4. A compound according to claim 1 in which
$R^1$ is methyl,
$R^2$ is acetyl,
$R^3$ is 5-methyl-1,3,4-thiadiazol-2-ylthio, and
M is hydrogen.

5. Compounds according to claim 1 in which
$R^1$ is phenyl or 2-thienyl,
$R^2$ is acetyl,
$R^3$ is hydrogen, and
M is hydrogen or sodium.

6. Compounds according to claim 1 in which
$R^1$ is phenyl or 2-thienyl,
$R^2$ is acetyl,
$R^3$ is azido, and
M is hydrogen or sodium.

7. Compounds according to claim 1 in which
$R^1$ is phenyl or 2-thienyl,
$R^2$ is acetyl,
$R^3$ is 2-thiazolylthio, 1,3,4-thiadiazol-2-ylthio, 5-methyl-1,3,4-thiadiazol-2-ylthio, 5-ethyl-1,3,4-thiadiazol-2-ylthio, 5-methylthio-1,3,4-thiadiazol-2-ylthio, 5-methyl-1,3,4-oxadiazol-2-ylthio or 1-methyl-1H-tetrazol-5-ylthio, and
M is hydrogen, sodium or potassium.

8. Compounds according to claim 1 in which
$R^1$ is phenyl,
$R^2$ is chloroacetyl, dichloroacetyl, propionyl, butyryl, isobutyryl, benzoyl, 2-thienylcarbonyl, p-chlorophenoxyacetyl, phenylacetyl or trichloroethoxycarbonyl,
$R^3$ is 5-methyl-1,3,4-thiadiazol-2-ylthio, and
M is hydrogen or sodium.

9. Compounds according to claim 1 in which
$R^1$ is p-nitrophenyl, p-methoxyphenyl or p-acetoxyphenyl,
$R^2$ is acetyl,
$R^3$ is 5-methyl-1,3,4-thiadiazol-2-ylthio or 1-methyl-1H-tetrazol-5-ylthio, and
M is hydrogen or sodium.

10. Compounds according to claim 1 in which
$R^1$ is phenyl,
$R^2$ is propionyl,
$R^3$ is 1,3,4-thiadiazol-2-ylthio, and
M is hydrogen or sodium.

11. Compounds according to claim 1 in which
$R^1$ is 2-thienyl,
$R^2$ is acetyl,
$R^3$ is 2-thiazolylthio, 1,3,4-thiadiazol-2-ylthio, 5-methyl-1,3,4-thiadiazol-2-ylthio, 5-methylthio-1,3,4-thiadiazol-2-ylthio, 5-methyl-1,3,4-oxadiazol-2-ylthio or 1-methyl-1H-tetrazol-5-ylthio, and
M is hydrogen or sodium.

12. Compounds according to claim 1 in which
$R^1$ is 2-thienyl,
$R^2$ is propionyl or benzoyl,
$R^3$ is 5-methyl-1,3,4-thiadiazol-2-ylthio, and
M is hydrogen or sodium.

References Cited
UNITED STATES PATENTS 3,516,997   6/1970   Takano et al. _____ 260—243 C
3,701,775   10/1972   Berges et al. _____ 260—243 C NICHOLAS S. RIZZO, Primary Examiner U.S. Cl. X.R.

424—246

PO-1050
(5/69)

UNITED STATES PATENT OFFICE
CERTIFICATE OF CORRECTION

Patent No. 3,812,116           Dated May 21, 1974

Inventor(s) Tadayoshi Takano et al.

It is certified that error appears in the above-identified patent and that said Letters Patent are hereby corrected as shown below:

Column 2, line 57, Insert as a separate paragraph after line 57 the sentence --The term "halogen" is preferably bromine or chlorine.--;
Column 3, line 18, "trilkylamine" should be --trialkylamine--;
Column 7, line 1, "(-thienyl)" should be --(2-thienyl)--;line 38, "0°-50°C." should be --0°-5° C.--
Column 9, For compounds numbered 42 and 43, "DL" should be --D--;
Column 11, For compounds numbered 64 and 65, "DL" should be --D--;
For compound numbered 33, the UV should be --271-272*-- instead of "*217-272";
Column 12, For compound numbered 56, the $E_{1\ cm}^{1\%}$ for 273 (inf) should be --221-- instead of "211".

Signed and sealed this 12th day of November 1974.

(SEAL)
Attest:

McCOY M. GIBSON JR.
Attesting Officer

C. MARSHALL DANN
Commissioner of Patents